United States Patent
Tanaka et al.

(10) Patent No.: US 6,926,750 B2
(45) Date of Patent: Aug. 9, 2005

(54) FILTER ELEMENT

(75) Inventors: Seiichi Tanaka, Saitama (JP); Akira Terasaki, Saitama (JP); Tatsuya Sagano, Saitama (JP); Hideyo Uehara, Saitama (JP); Hiroto Koura, Hyogo (JP); Tsumoru Okada, Hyogo (JP); Shinsuke Mizuta, Hyogo (JP); Takatsugu Miura, Hyogo (JP)

(73) Assignees: Honda Giken Kogyo Kabushiki Kaisha, Tokyo (JP); Tigers Polymer Corporation, Toyonaka (JP)

( * ) Notice: Subject to any disclaimer, the term of this patent is extended or adjusted under 35 U.S.C. 154(b) by 0 days.

(21) Appl. No.: 10/359,687

(22) Filed: Feb. 7, 2003

(65) Prior Publication Data

US 2003/0150199 A1 Aug. 14, 2003

(30) Foreign Application Priority Data

Feb. 7, 2002 (JP) .................................... 2002-030650
Dec. 11, 2002 (JP) .................................... 2002-359901

(51) Int. Cl.$^7$ .......................... B01D 46/52; B01D 29/07
(52) U.S. Cl. .......................... 55/486; 55/385.3; 55/487; 55/497; 55/521; 55/524; 55/527; 55/DIG. 24
(58) Field of Search .................... 55/385.3, 486–489, 55/497, 521, 524, 527, 528, DIG. 24

(56) References Cited

U.S. PATENT DOCUMENTS

| | | | | |
|---|---|---|---|---|
| 3,221,480 A | * | 12/1965 | Stefcik et al. ................ 55/524 |
| 4,093,437 A | * | 6/1978 | Ichihara et al. ............... 55/487 |
| 4,522,876 A | * | 6/1985 | Hiers ......................... 442/388 |
| 4,536,440 A | * | 8/1985 | Berg .......................... 442/346 |
| 4,701,197 A | * | 10/1987 | Thornton et al. ............. 55/487 |
| 4,702,940 A | * | 10/1987 | Nakayama et al. ......... 427/244 |
| 4,744,806 A | * | 5/1988 | Ozolins et al. ............... 95/273 |
| 4,759,782 A | * | 7/1988 | Miller et al. ................. 55/487 |
| 5,096,473 A | * | 3/1992 | Sassa et al. .................. 95/282 |
| 5,525,136 A | * | 6/1996 | Rosen ......................... 55/486 |
| 5,800,586 A | * | 9/1998 | Cusick et al. ................ 55/486 |
| 5,843,198 A | * | 12/1998 | Walker ........................ 55/486 |
| 6,146,436 A | * | 11/2000 | Hollingsworth et al. ..... 55/486 |
| 6,176,890 B1 | * | 1/2001 | Svedlind et al. ............ 55/524 |
| 6,336,947 B1 | * | 1/2002 | Atsumi et al. ............. 55/385.3 |
| 6,419,721 B1 | * | 7/2002 | Hunter ....................... 55/486 |
| 6,521,012 B2 | * | 2/2003 | Lamon et al. ............... 55/524 |
| 6,641,648 B2 | * | 11/2003 | Walker et al. ............... 55/487 |
| 6,652,748 B1 | * | 11/2003 | Choi ......................... 210/232 |
| 6,689,278 B2 | * | 2/2004 | Beplate ...................... 210/767 |
| 6,818,037 B2 | * | 11/2004 | Tanaka et al. ............... 55/487 |
| 2001/0035094 A1 | * | 11/2001 | Takagaki et al. ............ 96/154 |
| 2003/0046913 A1 | * | 3/2003 | Suzuki et al. ............... 55/486 |
| 2003/0106293 A1 | * | 6/2003 | Tanaka et al. ............... 55/482 |

FOREIGN PATENT DOCUMENTS

JP 10085539 4/1998

* cited by examiner

*Primary Examiner*—Robert H. Spitzer
(74) *Attorney, Agent, or Firm*—Oblon, Spivak, McClelland, Maier & Neustadt, P.C.

(57) ABSTRACT

A filter element comprises an oil-impregnated filtering member, and a transmission preventing layer formed on a downstream side of the filtering member, for restricting transmission of at least the carbon dusts from the oil-impregnated filtering member. The filtering member may be formed like a ridge-like-folded structure. The transmission preventing layer may be formed of a coating layer having a resistance against a viscous oil that is impregnated in the filtering member. This coating layer may be formed uniformly as a whole or the thickness or the content of the coating layer may be increased partially. A ventilation shutting-off member (filling layer) may be formed as the transmission preventing layer in the root portion areas of the ridge portions. The transmission preventing layer may comprise a resistant component that is insoluble in the oil that is impregnated in the filtering member.

18 Claims, 2 Drawing Sheets

FILTER ELEMENT

BACKGROUND OF THE INVENTION

1. Field of the Invention

The present invention relates to a filter element that is capable of collecting carbon dusts in a processed gas effectively and is useful as an air filter, etc. of a car, an internal combustion engine, etc.

2. Description of the Related Art

In the power source of the car, the motor bicycle, etc., it is important that sands and dusts in the suction system of the engine should be adsorbed/filtered by the filter element of the air cleaner to prevent the mixture of foreign matters into the engine, so that the engine can be caused to exhibit its function to its maximum.

In recent years, the filtering function of adsorbing and filtering the dusts, which have a wide particle size range extended from the dust with a large particle size such as a cloud of sand to the dust with a small particle size such as the carbon particle contained in the exhaust gas from the diesel car, etc. (referred to as the "carbon dust" hereinafter), is required of the filter element. Also, performances such as high cleaning efficiency, high dust holding capacity, long filtering lifetime, low intake resistance, etc. are required of the filter element at the same time.

As the filter element used at present, there may be listed the dry type filter that is formed of a filter paper, a non-woven fabric, or the like, which does not contain the oil, and the wet type filter that is formed of the filter paper or the non-woven fabric, which is impregnated with the viscous oil, for example.

As the dry type filter, in a Japanese Patent Unexamined Publication (KOKAI) Hei. 10-85539, the filter element consisting of the main filter, which is formed of the ridge-like-folded filtering member, and the pre-filter, which is arranged on the upstream side of this main filter and is formed of the non-woven fabric, are disclosed. This filter element can improve the dust holding capacity by increasing the bulk of the pre-filter. However, in the above filter element, if it is tried to implement the excellent dust holding capacity by the dry type filter, the bulk of the filter is increased even after the improved structure such as the ridge-like-folded structure, etc. to increase the adsorption area is employed. Thus, it is difficult to get the compact filter element.

In contrast, in the wet type filter, since the viscous oil on the surface of the filter can catch the dusts, the dust absorbing amount per volume of the filter can be increased, and thus reduction in size of the filter can be attained. Also, the clogging due to the dust is hard to occur and also the high cleaning efficiency can be attained. In addition, the wet type filter has such a feature that the lifetime of the wet type filter is longer than the dry type filter. However, in the wet type filter, it is known that the carbon dusts, which are caught by the oil in the filter, get out of the filter. Also, the viscous oil flows out with the flow of the gas, and thus an amount of the oil in the filter is reduced. Therefore, it is possible that, like the dust collecting mechanism of the dry type filter, reduction in the dust adsorbing capacity is caused and also the outflow oil contaminates the engine.

SUMMARY OF THE INVENTION

Therefore, it is an object of the present invention to provide a filter element that has a high carbon dust cleaning efficiency and a high dust holding capacity and also has a long filtering lifetime.

It is another object of the present invention to provide a filter element that is capable of removing the dusts, which have a wide particle size distribution, for a long term at a high cleaning efficiency and with high dust holding capacity.

In addition, it is further another object of the present invention to provide a filter element that is capable of removing the dusts, for a long term at a high efficiency, while reducing pressure loss even if the air flow accompanies with the large flow rate or the large pulsation.

In order to attain the above subjects, as the result of earnest studies, the inventors of the present invention have found that, if a filtering member that is impregnated with an oil and a transmission preventing layer that can restrict the transmission of at least the carbon dust are formed in specific order, not only the cleaning efficiency of the carbon dust in the processed gas can be largely improved but also the dust holding capacity (filtering lifetime) can be improved, and have completed the present invention.

More particularly, a filter element of the present invention comprises an oil-impregnated filtering member, and a transmission preventing layer formed on a downstream side of the filtering member, for restricting transmission of at least the carbon dusts from the oil-impregnated filtering member. The filtering member may be shaped into an appropriate shape, e.g., a ridge-like-folded structure. The transmission preventing layer is formed of a fiber layer having a resistance against a viscous oil that is impregnated in the filtering member. Also, the transmission preventing layer is formed of a coating layer having a resistance against a viscous oil that is impregnated in the filtering member. This coating layer may be formed uniformly as a whole or a thickness or a content of the coating layer may be increased partially. For example, in the ridge-like-folded filtering member, the thickness or the content of the coating layer may be increased largely in root portion areas of ridge portions. In addition, a ventilation shutting-off member (filling layer) may be formed as the transmission preventing layer in the root portion areas of the ridge portions. The transmission preventing layer or the coating layer may consist of a resistant component (resin, oil resistant agent, or the like) that is insoluble in the oil that is impregnated in the filtering member.

In the above filter element, a pre-filter may be arranged on an upstream side of the oil-impregnated filtering member. The filtering member of the oil-impregnated filtering member and the pre-filter consist of at least one of a filter paper and a non-woven fabric respectively. For example, the filtering member of the oil-impregnated filtering member may consist of a filter paper, and the pre-filter may consist of a non-woven fabric.

The transmission preventing layer may be made of the fiber layer containing the oil repellent agent, and the fiber layer of the transmission preventing layer may be formed more densely than the filter material or the oil-impregnated filter. In addition, the oil-impregnated filter material may be made of a plurality of filter materials whose densities are increased from the upstream side to the downstream side In such filter, the oil-impregnated filter material (e.g., viscous non-woven fabric that is impregnated with the viscous oil) has a higher cleaning efficiency than the filter material that is not impregnated with the oil (dry type filter material), and also its lifetime can be lengthened. Also, if the oil-impregnated filter material is employed, penetration of the dust can be prevented in the air flow with a large flow rate or a large pulsation rather than the dry-type filter material, and the pressure loss caused by oil adhesion is seldom generated. Also, the retention of dust can be improved with respect to even the dust whose particle-size distribution is wide. In addition, since the transmission preventing layer, which can transmit the air but restrict the penetration of the carbon dust, is formed on the downstream side of the oil-impregnated filter material, the cleaning efficiency of the carbon dust, the dust holding capability, and the filter life can be improved. Further, separation of the mixture (carbon oil) consisting of the carbon dust and the oil from the oil-impregnated filter material can be prevented by the transmission preventing layer (e.g., the dry non-woven fabric that is impregnated with the oil repellent agent, or the like).

Besides, if a fiber density of the oil-impregnated filter material is reduced, the pressure loss can be reduced and the dust life can be improved and also an amount of impregnated oil in the oil-impregnated filter material can be increased. Therefore, the cleaning efficiency can be enhanced due to an increased amount of impregnated oil, and thus the penetration of the dust can be prevented in the air flow with the large flow rate or the large pulsation. In addition, if a density of the transmission preventing layer is increased, the separation of the mixture (carbon oil) consisting of the carbon dust and the oil from the oil-impregnated filter material can be prevented. In order to get such merits, it is advantageous to use the non-woven fabric rather than the filter paper as the filter material (or the fiber layer).

DESCRIPTION OF THE PREFERRED EMBODIMENTS

The present invention will be explained in detail hereinafter while referring to the accompanying drawings as occasion demands.

[Filter Element]

Figure 1:
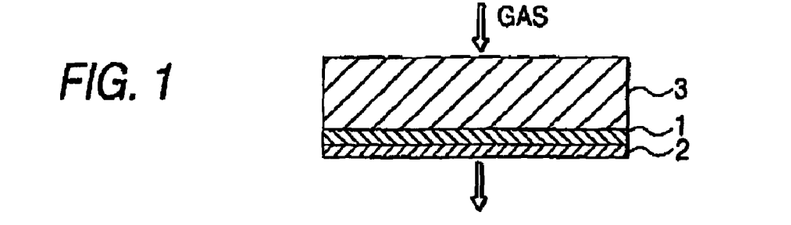
FIG. 1 is a schematic sectional view showing an example of a filter element according to the present invention.

FIG. 1 is a schematic sectional view showing a filter element according to the present invention. In this example, the filter element is formed of a filter paper, and consists of a sheet-like filtering member (oil-impregnated filtering member) 1 that is impregnated with an oil, and a transmission preventing layer (or transmission restricting layer) 2 that is formed of a coating on the overall surface on the downstream side of the filtering member along the flow direction of the processed gas. The transmission preventing layer (or transmission restricting layer) 2 can restrict the penetration of the carbon dust but can transmit the gas. In addition, a sheet-like pre-filter 3, which is made of a non-woven fabric as the dry filter, is laminated or arranged on the upstream side of the oil-impregnated filtering member 1. In this case, normally the oil-impregnated filter material 1 can be made of filter material (the filter paper, the non-woven fabric, or the like) that is impregnated with the viscous oil (viscosity oil), and is sometimes called the viscous filter material, the viscous non-woven fabric, or the like.

According to the filter element having such structure, the retention of the carbon dusts can be increased by the pre-filter 3 and also the retention or the catching ability of the dusts containing the carbon dusts, which have not been collected, can be increased by the oil-impregnated filtering member 1. In addition, not only the transmission of at least the collected carbon dusts but also the outflow of the oil can be restricted by the transmission preventing layer 2, and thus the collecting ability of the dust can be improved.

In this case, it may be considered that, in the filter element having the above structure, the dry filter should be aligned on the downstream side of the oil-impregnated filtering member (wet filter). However, in the filter element having such structure, the oil-impregnated filtering member is contaminated by the dust in a short time and thus the filtering performance is degraded in its early stage. Therefore, it is difficult to improve the filtering performance as a whole and also it is impossible to collect the carbon dusts effectively for a long time.

The oil-impregnated filtering member is not limited to a sheet-like or plate-like shape. The oil-impregnated filtering member may be bent or curved, or may be formed as the uneven shape.

Figure 2:
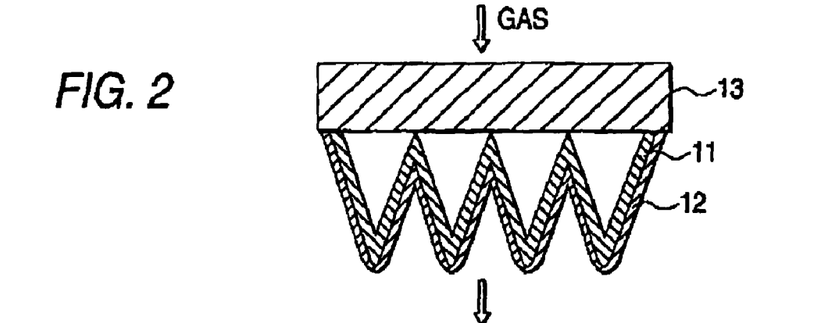
FIG. 2 is a schematic sectional view showing another example of the filter element according to the present invention.

FIG. 2 is a schematic sectional view showing another example of the filter element according to the present invention.

In this example, an oil-impregnated filtering member 11 is formed as a ridge-like-folded structure having a folded sectional shape. A sheet-like or plate-like pre-filter 13 is arranged on the upstream side of this oil-impregnated filtering member 11. A transmission preventing layer 12 is formed on the overall surface by a coating on the downstream side (or lower surface) of the oil-impregnated filtering member 11. In such filter, the ridge-like-folded structure of the oil-impregnated filter material 11 can improve a contact area to the processed gas and a cleaning efficiency in contrast to the filter having the above structure shown in FIG. 1, and thus can remove effectively the carbon dust.

The transmission preventing layer is not always formed uniformly on the overall surface on the downstream side of the oil-impregnated filtering member, but such transmission preventing layer may be formed to change its thickness or its content partially. Also, the transmission preventing layer may be formed on desired portions of the oil-impregnated filtering member in response to the shape of the filter element.

Figure 3:
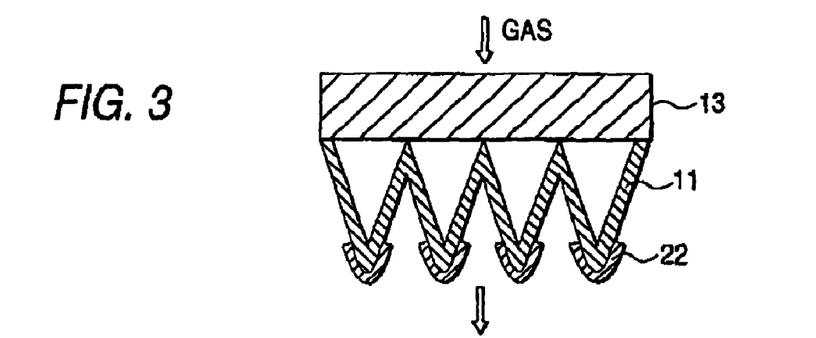
FIG. 3 is a schematic sectional view showing still another example of the filter element according to the present invention.

FIG. 3 is a schematic sectional view showing still another example of the filter element according to the present invention.

In this example, in view of the fact that the oil separation is particularly increased at the root portion of the oil-impregnated filtering member 11 having the ridge-like-folded structure, transmission preventing layers 22 are formed on portions in which the oil tends to gather or flow, e.g., root portion areas of the ridge portions of the oil-impregnated filtering member 11, by the coating or the impregnation. In this case, the transmission preventing layers are not always formed only on the root portions of the ridges. The transmission preventing layers may be formed on the overall surface of the oil-impregnated filtering member on the downstream side. In addition, a thickness of the transmission preventing layer may be increased on the root portion areas of the ridge portions of the oil-impregnated filtering member 11.

Further, the transmission preventing layers may be formed by ventilation shutting-off material on the portions, in which the oil is ready to gather, like the root portions of the ridges, or the like. If the ventilation shutting-off material is employed as the transmission preventing layers, an occupied area ratio of the transmission preventing layers to the oil-impregnated filtering member can be selected in the range where the pressure loss is not excessively increased. For example, such area ratio may be set to about 5 to 30%, preferably about 5 to 20%, and more preferably about 5 to 10% with respect to the overall area of the oil-impregnated filtering member on the downstream side.

In this case, in the present invention, the transmission preventing layer and the ventilation shutting-off material may be formed in combination. For example, the transmission preventing layer that can transmit the air may be formed on the downstream side of the oil-impregnated filter material, and also the ventilation shutting-off material may be arranged on the downstream side of the transmission preventing layer located at the place (e.g., the root portion of the ridge, etc.) in which the oil tends to gather.

Figure 4:
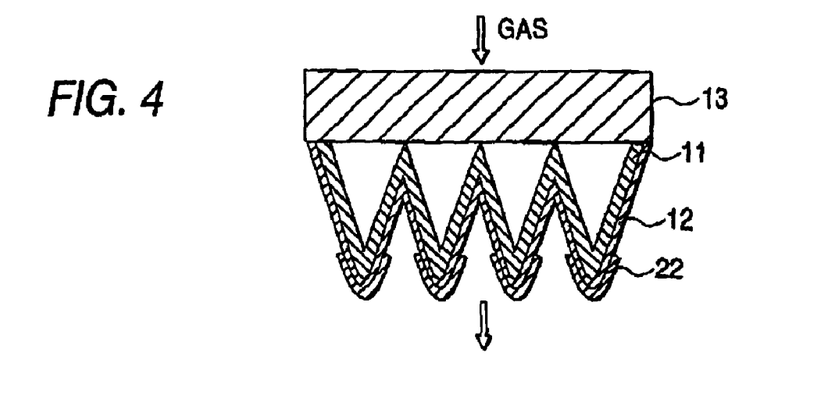
FIG. 4 is a schematic sectional view showing yet still another example of the filter element according to the present invention.

FIG. 4 is a schematic sectional view showing yet still another example of the filter element according to the present invention.

In this example, in the filter element having the structure shown in FIG. 2, which consists of the pre-filter 13, the oil-impregnated filtering member 11, and the transmission preventing layer 12, the transmission preventing layers 22 are laminated as the ventilation shutting-off material on portions of the transmission preventing layer 12, which corresponds to the root portion areas of the ridge portions in which the oil (particularly, the oil containing the carbon dusts) tends to gather or flow. According to the filter element having such structure, the dusts such as the carbon dusts, etc. can be collected more effectively.

Figure 5:
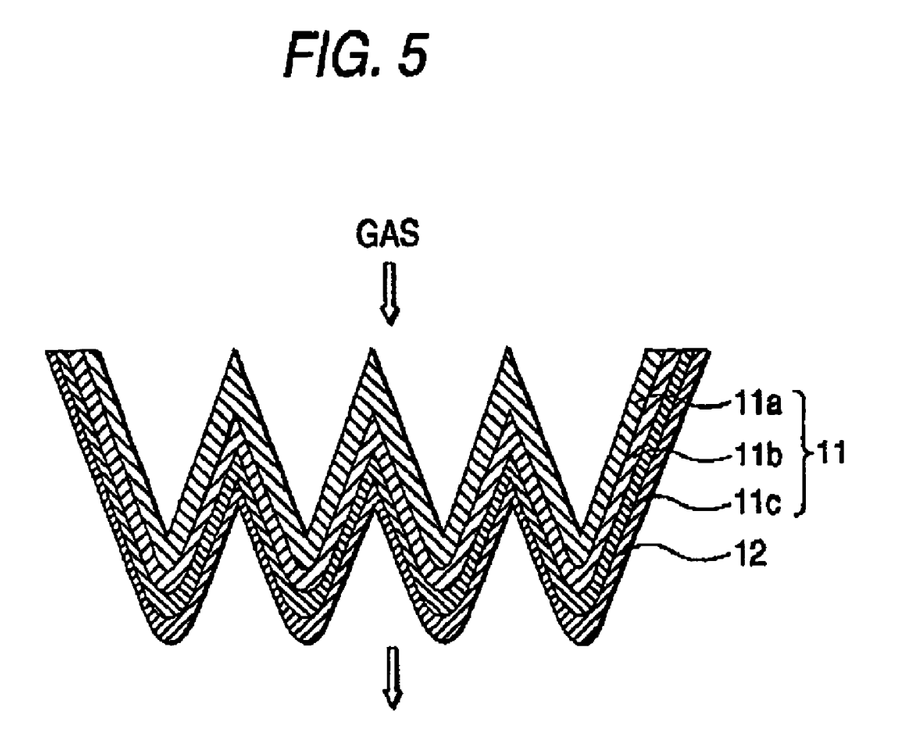
FIG. 5 is a schematic sectional view showing another example of the filter element of the present invention.

FIG. 5 is a schematic sectional view showing another example of the filter element of the present invention. In this example, the oil-impregnated filter material 11 is made of a laminated body consisting of a plurality of filter materials 11a, 11b, 11c that contain the oil respectively and also is formed into the ridge-like-folded structure having the folded sectional shape. A transmission preventing layer 12 that is made of a fiber layer containing the oil repellent agent and can transmit the air is formed over the entire surface on the downstream side (or the lower surface) of the oil-impregnated filter material 11c.

In addition, the filter material 11 (a plurality of filter materials 11a, 11b, 11c) has a density gradient that increases from the upstream side to the downstream side. Thus, the filter material 11a on the upstream side is formed coarsely and the filter material 11c on the downstream side is formed densely. In addition, the fiber layer of the transmission preventing layer 12 is formed to have a density that is larger than the filter materials 11a, 11b, 11c of the oil-impregnated filter material 11. In other words, in this example, the fiber layer of the transmission preventing layer 12 is formed dense rather than the downstream-side filter material 11c of a plurality of filter materials 11a, 11b, 11c.

If such filter is employed, such a situation can be suppressed that the oil-impregnated filter material 11 is clogged with the dust on the upstream side even when the oil that has collected the dust is caused to flow to the downstream side of the oil-impregnated filter material 11, for the oil-impregnated filter material has the density gradient. In particular, even when the filter is applied to the processed gas having a large flow rate or the processed gas as the pulsating flow, not only the pressure loss of the processed gas can be reduced but also the penetration of the dust can be prevented, and thus the cleaning efficiency can be improved since such filter is impregnated with the oil. Therefore, not only the pressure loss of the processed gas can be reduced but also the filtering life of the filter element can be prolonged rather than the filter material that is not impregnated with the oil (dry filter). Especially, since the oil-impregnated filter material 11 and the transmission preventing layer 12 that contains the oil repellent agent and has the larger density than the filter material are combined with each other, separation of the carbon oil can be prevented effectively while reducing the air-flow resistance. In this case, the filter element is not limited to the ridge-like shape but may be formed into a sheet-like shape, a folded shape, a curved shape, or an uneven shape. Also, a pre-filter may be arranged on the upstream side of the oil-impregnated filter material.

The filter element having the above structure shown in FIG. 5 can be prepared, for example, by laminating the filter material of the oil-impregnated filter material and the fiber layer of the transmission preventing layer containing the oil repellent agent as one body and then shaping the laminated body into the predetermined shape (the ridge-like-folded shape, the flat plate shape, or the like). More particularly, a method of laminating the oil-impregnated filter material made of the filter material containing the oil and the transmission preventing layer made of the fiber layer containing the oil repellent agent may be exemplified. In this case, if the nature of the oil repellent agent to repel the oil of the oil-impregnated filter material should be utilized, for example, the transmission preventing layer made of the fiber layer containing the oil repellent agent and the filter material that is not impregnated with the oil may be laminated, then the overall laminated body may be impregnated with the oil, and then the excessive oil may be removed.

(Oil-impregnated Filtering Member)

No particular limitation is imposed to the filtering members constituting the oil-impregnated filtering member as far as such member has the filtering function and can be impregnated with the viscous oil that has a high dust collecting efficiency. A member having a tissue in which the fibers are confounded at random (manufactured paper or web structure or tissue), e.g., filter paper, non-woven fabric, etc. can be employed. These filtering members may be used solely or in combination.

As the fiber constituting the filter paper or the non-woven fabric, there may be listed cellulose fiber and natural fiber such as pulp (wood pulp, linter pulp, etc.), etc., for example, synthetic fiber [e.g., polyolefin fiber ($polyC_{2-4}$olefin fiber such as polyethylene fiber, polypropylene fiber, etc.), acrylic fiber, polyester fiber (polyalkylene terephthalate fiber such as polyethylene terephthalate (PET), polybutylene terephthalate (PBT), etc., total aromatic polyester fiber, etc.), polyamide fiber (containing aromatic polyamide fiber such as aramid fiber, etc.), rayon fiber, etc.], inorganic fiber (glass fiber, metal fiber, ceramic fiber, carbon fiber, etc.), etc. These fibers may be used solely or in combination.

Out of these filtering members, the filter paper, which is made of the fiber such as the cellulose fiber or the like and has a manufactured paper structure, and the non-woven fabric, which is made of the synthetic fiber and has the web structure in which fibers are aligned at random and confounded with each other, are employed. Especially, as the filtering member constituting the oil-impregnated filtering member, normally the filter paper that has a high dust collecting efficiency at low cost is employed. In this case, the non-woven fabric can be formed by the common method, e.g., wet non-woven fabric, dry non-woven fabric, spanbond non-woven fabric, melt-blow non-woven fabric, or the like.

The filter material constituting the oil-impregnated filter material is not limited to a single filter material, but such filter material may be made of a plurality of filter materials (or a laminated body consisting of a plurality of filter materials). If a plurality of filter materials are employed, such filter material may be made of about 2 to 10 sheets of plural filter materials. In addition, the density of the oil-impregnated filter material may be formed uniformly over the entire structure or may be formed differently from the upstream side to the downstream side. For example, if the oil-impregnated filter material is made of a plurality of filter materials, respective filter materials may have the same density or such filter material may be made of same or different filter materials each having a different density. The oil-impregnated filter material may have the continuous or stepwise density gradient. For example, the upstream side may be formed densely and the downstream side may be formed coarsely. Normally the density of the upstream side may be set small and the density of the downstream side may be set large.

In this case, the common laminating method, e.g., the needle punch method, the stitch method, the jointing method by using the binder or the adhesive (liquid, powder or fluid like, fibrous, etc.), etc. may be exemplified as the method of jointing a plurality of filter materials. The binder may be formed of thermal adhesive resin that can be jointed by heating or heating/pressure jointing. These methods may be employed singly or in combination. Normally the physical laminating method such as the confounding of fibers, etc. (for example, the needle punch method, the stitch method, or the like), the thermal adhesive or hot-melt adhesive resin (thermal adhesive or hot-melt adhesive fiber, or the like), etc. may be utilized.

As the binder, for example, olefin resin (e.g., polyethylene, polypropylene, or the like), polyvinyl alcohol resin, vinyl acetate resin, acryl resin, halogen-containing vinyl resin (e.g., poly(vinyl chloride), or the like), polyamide resin, polyester resin, polyurethane resin, thermoplastic elastomer, etc. may be listed. These resins may be employed singly or in combination. The shapes of the filtering members are not particularly limited. A two-dimensional structure such as a sheet structure, a flat plate structure, or the like, may be employed, otherwise a three-dimensional structure such as a cylindrical structure, bent or curved (or corrugated) structure, ridge-like-folded structure, or the like may be employed. In addition, the filtering member may be formed like the unevenness by the embossing, or the like. The preferable shape to enhance a specific surface area is the bent or curved (or corrugated) structure, or the ridge-like-folded structure.

The oil that is to be permeated into the filtering member is not particularly limited as far as its retention for the dust such as the carbon dust, etc. is not spoiled. The normal air filter oil (high viscosity oil) can be employed. As the oil component, there may be listed petroleum oil (e.g., naphthene oil, paraffin oil, liquid paraffin, etc.), synthetic hydrocarbon oil [e.g., olefin polymerized oil, e.g., poly($\alpha$-olefin) such as polybutene, etc.], alkyibenzene, alkyl naphthalene, synthetic naphthene, etc.), aliphatic ester (e.g., alkylester of polyhydric carboxylic acid such as dialkyl ester of $C_{6-12}$alkane dicarboxylic acid, polyol ester, etc.), polyglycol (e.g., polyalkylene glycol, etc.), phenyl ether (e.g., alkyl-diphenyl ether, etc.), phosphate (e.g., aromatic phosphate, aliphatic phosphate, etc.), silicon oil [e.g., poly(dimethylsiloxane), poly(phenyl methylsiloxane), silicate, etc.], etc.

The oil component may contain various additives, e.g., viscosity regulator, viscous agent, adhesives, high boiling solvent (e.g., mineral oil), antioxidant (e.g., thermal antioxidant, oxidation inhibitor, ultraviolet absorbent, etc.), filler (containing the pigment), etc. as the case may be. The kinetic viscosity of the oil is set to about 1 to 10000 cSt, preferably about 10 to 1000 cSt, and more preferably about 15 to 400 cSt (e.g., 19 to 150 cSt) at the temperature of 40° C., for example.

An amount of oil contained in the filter material is set to about 10 to 120 g, preferably about 20 to 100 g, and more preferably about 25 to 80 g, for example, per the filter material 100 g. In this case, as the oil impregnating method, the common method such as a spraying method, a dipping method, or the like may be employed, for example. If necessary, in order to increase the permeability to the filtering member, the high-viscosity oil that is diluted by the solvent may be impregnated in the filtering member and then the solvent may be removed. In addition, the viscosity of the oil may be lowered by the heating to improve the impregnating efficiency.

In this case, normally the oil-impregnated filter material is employed as the viscous filter paper, which contains the viscous oil or is impregnated with the viscous oil, or the viscous non-woven fabric in many cases.

(Transmission Preventing Layer)

The transmission preventing layer for restricting the transmission of at least the carbon dusts may be arranged or formed on the downstream side of the oil-impregnated filtering member. The transmission preventing layer may be made of a coating layer or ventilation shutting-off material or a ventilation shutting-off layer (filling layer). Also, the transmission preventing layer may be made of a fabric layer that has a resistance against the oil. For example, the transmission preventing layer may be made of a fabric layer formed of fluorine fibers, or the like. In this case, normally the transmission preventing layer made of the coating layer, or the like has a function of preventing the outflow of the oil to the outside of the filter. Therefore, an amount of the oil enough to catch or adsorb the dusts can be maintained, and thus such transmission preventing layer is advantageous to the carbon dust adsorbing mechanism.

The transmission preventing layer (containing the ventilation shutting-off material or the ventilation shutting-off layer) can be formed of insoluble resistant component against the oil, which is impregnated in the filtering member, as far as such transmission preventing layer can prevent the transmission of the carbon dusts and does not increase excessively the pressure loss. As such resistant component, there may be listed oil repellent agent, synthetic resin, metal, glass, ceramics, etc., for example. These materials may be employed solely or in combination.

As the oil repellent agent, the oil component having high oil repellent, e.g., silicon oil or silicon grease (or silicon gum), fluorine-containing oil component [homopolymer or copolymer of fluorine-containing monomer such as poly(chlorotrifluoroethylene), poly(trifluoropropyl methylsiloxane), perfluoropolyether, or the like, copolymer of the fluorine-containing monomer and copolymeric monomer, etc.], etc. may be listed. The fluorine-containing oil component may be made of low molecular weight polymer of fluorine-containing monomer (fluororesin oligomer). These oil repellent agents may be employed singly or two agents or more may be employed in combination. Like an amount of contained oil, an amount of contained or impregnated oil repellent agent may be set to about 0.5 to 60 g, preferably about 1 to 40 g, and more preferably about 2 to 30 g, for example, per the filter material 100 g.

As the oil repellent agent as the resistant component, there may be listed oil component having high water repellency, e.g., silicon oil, silicon grease (or silicon gum), fluorine-containing oil component [poly (chlorotrifluoroethylene), poly(trifluoropropyl methysiloxane), perfluoropolyether, etc.], etc. in response to the oil that is impregnated in the filtering member.

As the synthetic resin, there may be listed various thermoplastic resins, various thermosetting resins, etc. The thermoplastic resin may be formed of hot-melt adhesive resin, or the like.

As the thermoplastic resin, there may be listed olefin resin [e.g., homopolymer or copolymer of $C_{2-10}$ olefin (polyethylene, polypropylene, ethylene-propylene copolymer, etc.), ethylene-vinyl acetate copolymer, ethylene-(meta)acrylate copolymer, ionomer resin, etc.], halogen-containing vinyl resin [e.g., chlorine-containing vinyl resin (e.g., poly(vinyl chloride), copolymer of vinylidene chloride and copolymeric monomer (vinyl chloride, vinyl acetate, acrylonitrile, etc.), fluorine-containing vinyl resin (e.g., polyfluorovinyl, poly (vinylidene fluoride), polytrifluoroethylene, ethylene-trifluoroethylene copolymer, polychlorotrifluoroethylene, polytetrafluoroethylene, copolymer of tetrafluoroethylene and copolymeric monomer (ethylene, propylene, perfluoroalkylvinylether, etc.), etc.), polyamide resin (e.g., nylon 66, nylon 610, nylon 612, nylon 11, nylon 12, etc.), styrene resin [e.g., acrylonitrile-styrene copolymer (AS resin), etc.], polycarbonate resin, acrylic resin, polyester resin (polyalkylene allylate such as polyethylene terephthalate, polybutylene terephthalate, or their copolyesters, etc.), polysulfone resin (polysulfone, polyether sulfone, etc.), polyphenylene resin (polyphenyleneoxido, polyphenylenesulfide, etc.), etc. As the thermoplastic resin, elastomer, e.g., thermoplastic elastomer such as polyolefin thermoplastic elastomer, polyurethane thermoplastic elastomer, polyester thermoplastic elastomer, polyamide thermoplastic elastomer, etc. may be used. These resins may be employed solely or in combination. The preferable resin is the olefin resin, the fluorine-containing vinyl resin, or the like.

As the thermosetting resin, there may be listed polyurethane resin, epoxy resin, unsaturated polyester resin (containing vinyl ester resin), thermosetting acrylic resin, silicon resin, polyimide resin, etc.

The synthetic resin may contain the additive (e.g., plasticizer, oxidation inhibitor, ultraviolet absorbent, flame retardant, coloring agent, antistatic agent, lubricant, etc.) as the case may be. Also, the hot-melt adhesive resin may contain tackifier (rosin or its derivative, terpene resin, hydrogen-added styrene resin, etc.), thermostabilizer (oxidation inhibitor, etc.), etc. in addition to the base resin (olefin resin such as polyethylene, ethylene-propylene copolymer, ethylene-vinyl acetate copolymer, etc., polyamide resin such as nylon 610, nylon 612, etc.).

As the metal, there may be listed iron or its alloy (stainless steel, etc.), aluminum, copper, etc., for example.

In this case, the transmission preventing layer (containing the ventilation shutting-off material or the ventilation shutting-off layer) may be formed on the oil-impregnated filtering member by coating or permeating the coating agent, the hot-melt adhesive resin, or the like. Otherwise, the transmission preventing layer may be formed by jointing the molded member, which is shaped previously into the shape that is fitted to the oil-impregnated filtering member, to the oil-impregnated filtering member by the cement such as the adhesives as the case may be. If the molded member is employed, such molded member may be jointed to the oil-impregnated filtering member by the adhesives, the thermal welding, etc. As the molded member, plastics or resin, metal, ceramics, etc. may be employed. Also, the molded member may be employed in the mode of film, sheet, or the like.

A rate (or a coated amount) of the transmission preventing layer may be set to about 1 to 100 g/m², preferably about 0.5 to 50 g/m², and more preferably about 1 to 25 g/m², for example.

In addition, a thickness of the ventilation shutting-off material or the ventilation shutting-off layer may be set to about 1 to 5000 µm, preferably about 5 to 500 µm, and more preferably about 10 to 200 µm, for example.

The density of the fiber layer of the transmission preventing layer that contains the oil repellent agent may be set identically to or differently from the filter material of the oil-impregnated filter material. In the preferred embodiment, the fiber density of the fiber layer of the transmission preventing layer is largely denser than the filter material of the oil-impregnated filter material. In this case, the transmission preventing layer may be formed of a single fiber layer or may be formed of a plurality of same or different fiber layers. If a plurality of fiber layers are employed, their densities may be set equally or differently. For example, the fiber density of the fiber layer may be reduced or increased from the upstream side to the downstream side. In the preferred embodiment, in many cases the fiber density of the fiber layer is increased from the upstream side to the downstream side.

The bulk density of the fiber layer constituting the transmission preventing layer may be set to about 0.02 to 0.7 g/cm³, preferably about 0.03 to 0.5 g/cm³, and more preferably about 0.05 to 0.3 g/cm³, for example. Also, if the bulk density of the filter material constituting the oil-impregnated filter material is set to "1", the bulk density of the fiber layer constituting the transmission preventing layer may be set to about 1.1 to 2.5, preferably about 1.2 to 2.2, and more preferably about 1.3 to 2, for example. In this case, a thickness of the fiber layer constituting the transmission preventing layer is not particularly limited, and may be selected according to the structure of the filter element, etc. If a thickness of the filter material constituting the oil-impregnated filter material is set to "1", the thickness of the fiber layer may be set to about 0.01 to 2, and preferably about 0.03 to 0.3, for example.

(Pre-filter)

As the pre-filter, like the filtering member, the filter paper, the non-woven fabric, etc. may be employed. These pre-filters may be employed solely or in combination. The preferable pre-filter is the non-woven fabric (non-woven fabric made of the synthetic fiber).

The tissue of the pre-filter may have the density that is similar to the tissue of the filtering member, or may have the higher or lower density than the filtering member. The bulk density of the pre-filter made of the filter paper or the non-woven fabric may be set to about 0.01 to 0.7 g/cm$^3$, preferably about 0.01 to 0.1 g/cm$^3$, and more preferably about 0.02 to 0.05 g/cm$^3$, for example. In addition, the void fraction (%) of the pre-filter may be set to about 70 to 99%, preferably about 80 to 99%, and more preferably about 90 to 99%, for example. The void fraction of the pre-filter may be spread uniformly as a whole, otherwise the void fraction may be changed from the upstream to the downstream to have the gradient of the void fraction. For example, the tissue of the pre-filter may be set coarse or dense on the upstream side and dense or coarse on the downstream side respectively. In addition, the tissue of the pre-filter may be set dense or coarse on the upstream side and the downstream side and coarse or dense in the intermediate portion respectively. Normally the pre-filter has the gradient of the void fraction, which is increased from the upstream to the downstream. Such pre-filter may be formed by laminating a plurality of pre-filters each having a different density.

A thickness of the pre-filter may be set to about 3 to 50 mm, preferably about 5 to 30 mm, and more preferably about 5 to 20 mm, for example.

In this case, the pre-filter serving as the dry filter, which is arranged on the upstream side of the oil-impregnated filtering member, is not always required. However, if the pre-filter is arranged on the upstream side of the oil-impregnated filtering member, the high collecting efficiency of the carbon dusts can be maintained for a long term. Also, the pre-filter is not limited to the sheet-like or plate-like shape, and may be shaped in the bent or curved shape, uneven shape, ridge-like-folded shape, etc. In addition, the pre-filter may have such a structure that the pre-filter is separated partially from the oil-impregnated filtering member, otherwise the pre-filter may have such a structure that the pre-filter is laminated or superposed integrally with the oil-impregnated filtering member.

[Processed Gas]

The filter element of the present invention is useful to process the processed gas (e.g., air, exhaust gas, etc.) containing the carbon dusts. Also, this filter element is useful to process the processed gas, which contains particles whose particle size is the almost same as the carbon dust (several nm to 500 nm (e.g., about 3 to 200 nm)), as well as the carbon dust. Therefore, this filter element is available for various applications, for example, air filter, emission regulation filter, etc. for internal combustion engine (e.g., car engine, etc.), compressor, etc.

According to the present invention, since the oil-impregnated filtering member and the transmission preventing layer are provided in specific order, not only the carbon dust cleaning efficiency can be increased but also the carbon dust holding capacity can be largely improved, so that the filter lifetime can be prolonged. Also, the filter element of the present invention is excellent in the cleaning efficiency and the dust holding capacity of the dusts that have a wide particle size distribution, and thus the filter element having a long filter lifetime can be implemented.

Further, with the filter element of the present invention, it is possible to remove the dusts, for a long term at a high efficiency, while reducing pressure loss even if the air flow accompanies with the large flow rate or the large pulsation.

EXAMPLES

The present invention will be explained in more detail with reference to examples hereunder. But the present invention is not limited by these examples.

Example 1

The fluorine oil repellent agent was coated on an overall surface of the viscous filter paper (oil amount: 130 g/m$^2$, oil kinetic viscosity: 32.6 cSt) on one side to have a coating amount of 6 g/m$^2$, and then this viscous filter paper was shaped into the ridge-like-folded shape. The filter element was obtained without use of the pre-filter 13 in FIG. 2.

This filter element was arranged so as to direct the transmission preventing layer side toward the downstream side to accept the air-flow resistance test, the cleaning efficiency test, and the dust holding capacity test.

Example 2

The hot-melt adhesive resin was coated on the root portion areas of the ridges of the viscous filter paper, which is shaped into the ridge-like-folded shape and is the same as Example 1, to have a coating amount of 70 g/m$^2$ such that this resin has a length of 2 to 4 mm from the root bottom to both side directions. The filter element was obtained without use of the pre-filter 13 in FIG. 3.

This filter element was arranged so as to direct the transmission preventing layer side toward the downstream side to accept the air-flow resistance test, the cleaning efficiency test, and the dust holding capacity test.

Example 3

The filter element shown in FIG. 2 was obtained by arranging the pre-filter [type of the non-woven fabric: PET, thickness: 18 mm, grammage (so called as a metsuke (weight per unit area): 365 g/m$^2$} on the oil-impregnated filter member side of the filter element in Example 1.

This filter element was arranged so as to direct the transmission preventing layer side toward the downstream side to accept the air-flow resistance test, the cleaning efficiency test, and the dust holding capacity test.

Example 4

The filter element shown in FIG. 3 was obtained by arranging the pre-filter, which is the same as Example 3, on the oil-impregnated filter member side of the filter element in Example 2.

This filter element was arranged so as to direct the transmission preventing layer side toward the downstream side to accept the air-flow resistance test, the cleaning efficiency test, and the dust holding capacity test.

Example 5

The oil repellent agent, which is the same as Example 1, was coated on the overall surface of the viscous filter paper in Example 1 on one side to have the coating amount of 6 g/m$^2$, and then this viscous filter paper was shaped into the ridge-like-folded shape. Then, the above oil repellent agent was coated on the root portion areas of the ridges on the coated surface side to have the coating amount of 20 g/m$^2$ such that this agent has a length of 2 to 4 mm from the root bottom to both side directions. Then, the filter element shown in FIG. 4 was obtained by arranging the pre-filter, which is the same as Example 3, on the oil-impregnated filter member side of the resultant filter.

This filter element was arranged so as to direct the transmission preventing layer side toward the downstream side to accept the air-flow resistance test, the cleaning efficiency test, and the dust holding capacity test.

Example 6

The fluorine oil repellent agent was coated on one surface of the viscous non-woven fabric (type of the non-woven fabric; PET, thickness: 3 mm, grammage: 300 g/m², oil amount: 130 g/m², oil kinetic viscosity: 32.6 cSt) on one side to have the coating amount of 10 g/m² and then this viscous non-woven fabric was shaped into the ridge-like-folded shape. The filter element was obtained without use of the pre-filter 13 in FIG. 2.

This filter element was arranged so as to direct the transmission preventing layer side toward the downstream side to accept the air-flow resistance test, the cleaning efficiency test, and the dust holding capacity test.

Example 7

A filter that is made of the laminated body (the oil-impregnated filter material), which is formed of three types of non-woven fabrics each having a different density and is impregnated with the viscous oil, and the transmission preventing layer, which is impregnated with the oil repellent agent, was prepared. More particularly, the non-woven fabric (40 g/m²), which consists of the PET fiber 50 wt % with a fiber diameter of 1.1 dt and the thermal adhesive PET fiber 50 wt % with a fiber diameter of 2.2 dt, was prepared by the needle punch method, and then the transmission preventing layer was prepared by infiltrating the fluorine oil repellent agent by an impregnated amount of 10 g/m² and then drying the resultant material.

In the meanwhile, the first non-woven fabric (60 g/m²), which is made of the polyethylene terephthalate fiber (PET fiber) 50 wt % with a fiber diameter of 6.6 dt and the thermal melt or adhesive polyethylene terephthalate fiber (thermal adhesive PET fiber) 50 wt % with a fiber diameter of 4.4 dt, the second non-woven fabric (40 g/m²), which is made of the PET fiber 50 wt % with a fiber diameter of 1.6 dt and the thermal adhesive PET fiber 50 wt % with a fiber diameter of 2.2 dt, and the third non-woven fabric (80 g/m²), which is made of the PET fiber 50 wt % with a fiber diameter of 1.3 dt and the thermal adhesive PET fiber 50 wt % with a fiber diameter of 2.2 dt, were laminated sequentially. Then, the transmission preventing layer was laminated on the third non-woven fabric, and then they are united with each other by the needle punch method. Then, the element in which the filter material (the filter material for the oil-impregnated filter material) having a triple-layered structure and the transmission preventing layer having a single-layer structure are laminated was prepared by heating/pressuring (heat set).

Then, a frame body was formed by injecting the resin into a peripheral portion the element by virtue of the insert molding. Thus, the flat plate element in which the frame body is united with the element was manufactured. Then, the element was impregnated with a mineral oil (kinematic viscosity: 32 cSt) and then was subjected to the centrifugal separation process to remove the excessive oil. Thus, the filter element that is impregnated with the predetermined mineral oil was manufactured. In this case, in this method, if the fiber layer of the transmission preventing layer is impregnated previously with the oil component, the oil can be infiltrated into the filter material constituting the oil-impregnated filter material because this oil component has the oil repellency. The filter element was arranged to direct the transmission preventing layer side toward the downstream side, and was subjected to the air-flow resistance test, the cleaning effect test, and the dust holding capacity test.

Comparative Example 1

The viscous filter paper, which is shaped into the ridge-like-folded shape and is the same as Example 1, was used as the filter element without formation of the transmission preventing layer 12 and the pre-filter 13 in FIG. 2.

Comparative Example 2

The non-woven fabric (type of the non-woven fabric: PET, thickness: 3 mm, grammage: 300 g/m²), which is shaped into the ridge-like-folded shape, was used as the filter element.

Comparative Example 3

The viscous non-woven fabric (formed as the ridge-like-folded shape, oil amount: 130 g/m²) was manufactured by permeating the viscous oil (oil kinetic viscosity: 32.6 cSt) into the non-woven fabric, which is the same as Comparative Example 2, and was used as the filter element.

The air-flow resistance test, the cleaning efficiency test, and the dust holding capacity test for the JIS-8 dust and the carbon dust were applied to the filter elements in Examples 1 to 6 and Comparative examples 1 to 3 based on JIS D1612 (car air cleaner test method). Measuring items and testing conditions of respective tests will be given hereunder.

[Air-flow Resistance Test]

An initial air-flow resistance value (initial pressure loss) was measured under the following test conditions.

Effective filtering area of the filter element: 0.432 m²

Tested dust: JIS-8 dust [dust of eighth type (fine grain) defined by JIS Z 8901 (tested dust), dust density: 0.12 g/m³], carbon dust [lamp black (light oil burnt carbon), dust density: $9 \times 10^{-3}$ g/m³]

Dust supply amount: 1.0 g/min

Air speed: 19.2 m/min

Test flow rate: 8.3 m³/min

[Cleaning Efficiency Test]

The cleaning efficiency test was carried out under the same test conditions as the air-flow resistance test, and an initial cleaning efficiency and a full-life cleaning efficiency were measured.

The initial cleaning efficiency and the full-life cleaning efficiency were measured with respect to JIS-8 dust. The full-life cleaning efficiency was measured with respect to the carbon dusts.

In this case, the initial cleaning efficiency signifies the cleaning efficiency at the point where the dust supply amount is smallest (initial cleaning efficiency). In the present test, the cleaning efficiency obtained when a total dust supply amount comes up to 20 g was used as the initial cleaning efficiency. The full-life cleaning efficiency signifies the cleaning efficiency at the point of operating limit of the air filter. In the present test, the cleaning efficiency obtained when the air-flow resistance comes up to 2.94 kPa was used as the full-life cleaning efficiency.

The cleaning efficiency was calculated by a following equation (1).

$$\eta = (A/(A+C)) \times 100 \tag{1}$$

(Where η is the cleaning efficiency (%), A is a weight increased amount (g) of the tested air filter, and C is a weight increased amount (g) of the absolute filter.)

[Dust Holding Capacity Test]

The dust holding capacity test was carried out under the same testing conditions as the air-flow resistance test.

The dust holding capacity obtained when the air-flow resistance reaches 2.94 kPa was used as the dust holding capacity (dust life), and was calculated by a following equation (2).

$$D = A = A_2 - A_1 \tag{2}$$

(Where D is the dust holding capacity (g), $A_1$ is a weight (g) of the air filter prior to the test, and $A_2$ is a weight (g) of the air filter after the test. A is the same as the equation (1).

Measured results were given in Table 1.

TABLE I

|  | Example | | | | | | | Comparative Example | | |
|---|---|---|---|---|---|---|---|---|---|---|
|  | 1 | 2 | 3 | 4 | 5 | 6 | 7 | 1 | 2 | 3 |
| JIS-8 DUST | | | | | | | | | | |
| Initial pressure loss (mmAq) | .256 | 257 | 302 | 292 | 294 | 332 | 237 | 247 | 294 | 316 |
| Initial cleaning efficiency (%) | 99.6 | 99.1 | 99.5 | 99.6 | 99.6 | 99.1 | 99.0 | 98.8 | 97.8 | 99.3 |
| Fill-life cleaning efficiency (%) | 99.7 | 99.7 | 99.6 | 99.7 | 99.6 | 99.5 | 99.5 | 99.5 | 98.5 | 99.3 |
| Dust life (g) | 108 | 110 | 267 | 237 | 244 | 118 | 105 | 135 | 132 | 136 |
| Carbon Dust | | | | | | | | | | |
| Initial pressure loss (mmAq) | 317 | 323 | 357 | 362 | 379 | 411 | 240 | 313 | 385 | 398 |
| Fill-life cleaning efficiency (%) | 64 | 59 | 73 | 68 | 86 | 71 | 81 | 20 | 85 | ※ |
| Carbon life (g) | 5.5 | 6.9 | 16.6 | 18.5 | 7.5 | 3.1 | 3.5 | 5.0 | 2.0 | ※ |

※ Not measured because of escape of the viscous oil

As apparent from Table 1, the examples exhibit the high carbon dust cleaning efficiency and the long dust life not to increase the pressure loss. Also, as apparent from measured results in Examples 3 to 5, such Examples exhibit the high cleaning efficiency and the long dust life against the JIS-8 dust if the pre-filter is combined with the filter element that consists of the oil-impregnated filtering member and the transmission preventing member. In addition, as apparent from measured results in Example 7, if the fiber layer of the transmission preventing layer containing the oil repellent agent is denser than the filter material of the oil-impregnated filter material, not only the high collecting efficiency of JIS-8 type dust was exhibited but also the initial pressure loss could be reduced largely. Thus, the dust could be removed effectively for a long term.

Further, a pulsating penetration rate of the filter elements in Example 7 and Comparative Example 2 was measured by the following method.

[Pulsating Penetration Rate]

The pulsation is applied to the element, which is to be subjected to the dust holding capacity test, for 30 minute under the conditions that a gas volume is 5.4 m$^3$/min, a pulsating amplitude is 25 mmHg, and a pulsating frequency is 167 Hz. Then, the dust penetration rate of the element was calculated by a following equation.

Pulsating Penetration Rate=[an amount of transmitted dust after the pulsation/dust holding capacity of the element]×100

As a result, the pulsating penetration rate of the filter element in Example 7 was 0.55% whereas the pulsating penetration rate of the filter element (dry non-woven fabric) in Comparative Example 2 was 5.91%.

[Effect of the Invention]

According to the present invention, it is possible to largely improve the cleaning efficiency of the carbon dust in the processed gas and also the dust holding capacity (filtering lifetime).

What is claimed is:

1. A filter element for processing a processed gas containing carbon dusts, comprising:
    an oil-impregnated filtering member; and
    a transmission preventing layer formed on a downstream side of the filtering member, for restricting transmission of at least the carbon dusts from the oil-impregnated filtering member;
    wherein said oil-impregnated filtering member and said transmission preventing layer have a folded structure and said transmission preventing layer has a thickness larger in root portion areas than in other portion areas.

2. The filter element according to claim 1, wherein the transmission preventing layer is formed of a coating layer having a resistance against a viscous oil that is impregnated in the filtering member.

3. The filter element according to claim 2, wherein the coating layer consists of a resistant component that is insoluble in an oil that is impregnated in the filtering member.

4. The filter element according to claim 1, wherein the transmission preventing layer is formed of ventilation shutting-off members that are formed in the root portion areas of the folded structure.

5. The filter element according to claim 1, further comprising: a pre-filter arranged on an upstream side of the oil-impregnated filtering member.

6. The filter element according to claim 5, wherein the filtering member of the oil-impregnated filtering member comprises at least one of a filter paper and a non-woven fabric, and the pre-filter comprises at least one of a filter paper and non-woven fabric.

7. The filter element according to claim 5, wherein the filtering member of the oil-impregnated filtering member comprises a filter paper and the pre-filter consists of a non-woven fabric.

8. A filter element for processing a gas including carbon dusts, comprising:
    an oil-impregnated layer in an upstream side; and
    a fiber layer formed on a downstream side of the oil-impregnated layer, wherein at least one of said oil-impregnated layer or said fiber layer is of increasing density from said upstream side to said downstream side.

9. The filter element according to claim 8, wherein said oil-impregnated layer and said fiber layer is of increasing density from said upstream side to said downstream side.

10. The filter element according to claim 8, wherein said fiber layer comprises an oil-repellent agent.

11. The filter element according to claim 10, wherein said oil-repellent agent is in a range from 2 g to 30 g per 100 g.

12. The filter element according to claim 8, wherein said fiber layer has a variable bulk density between 0.05 g/cm$^3$ and 0.3 g/cm$^3$.

13. The filter element according to claim 8, wherein said oil-impregnated layer includes between 25 g and 80 g of an oil per 100 g filter material of said oil-impregnated layer.

14. The filter element according to claim 8, wherein the fiber layer is coated with a layer having a resistance against a viscous oil included in said oil-impregnated layer.

15. The filter element according to claim 14, wherein the fiber layer is formed of a fiber having a resistance against a viscous oil that is impregnated in the oil-impregnated layer.

16. The filter element according to claim 8, wherein the fiber layer contains an oil repellent agent, and a density of the fiber layer is higher than a density of a filter material of the oil-impregnated layer.

17. The filter element according to claim 8, wherein the oil-impregnated layer is made of non-woven fabric, and the fiber layer is made of non-woven fabric.

18. A filter element comprising:
an oil-impregnated filtering material layer having a laminated body of a plurality of non-woven fabrics with different densities, said densities increasing from an upstream side to a downstream side; and
a transmission preventing layer for restricting at least a transmission of a carbon dust; wherein the transmission preventing layer is formed of a non-woven fabric layer containing an oil repellent agent arranged on a downstream side of the oil-impregnated filtering material layer and a density of the transmission preventing layer is higher than a density of the downstream side of the oil-impregnated filtering material layer and the oil-impregnated filtering material layer is thicker than the transmission preventing layer.

* * * * *